US012327909B2

(12) United States Patent
Wu et al.

(10) Patent No.: US 12,327,909 B2
(45) Date of Patent: Jun. 10, 2025

(54) ELECTRONIC DEVICE

(71) Applicant: PEGATRON CORPORATION, Taipei (TW)

(72) Inventors: Chien-Yi Wu, Taipei (TW); Hau Yuen Tan, Taipei (TW); Chao-Hsu Wu, Taipei (TW); I-Shu Lee, Taipei (TW); Shih-Keng Huang, Taipei (TW); Chia-Hung Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 191 days.

(21) Appl. No.: 17/988,757

(22) Filed: Nov. 17, 2022

(65) Prior Publication Data

US 2023/0178875 A1 Jun. 8, 2023

(30) Foreign Application Priority Data

Dec. 6, 2021 (TW) ................................ 110145422

(51) Int. Cl.
*H01Q 1/22* (2006.01)
*H01Q 1/36* (2006.01)
(Continued)

(52) U.S. Cl.
CPC ............ *H01Q 1/2266* (2013.01); *H01Q 1/36* (2013.01); *H01Q 1/48* (2013.01); *H01Q 5/307* (2015.01)

(58) Field of Classification Search
CPC .......... H01Q 1/2266; H01Q 1/36; H01Q 1/48; H01Q 5/307; H01Q 5/378; H01Q 5/20;
(Continued)

(56) References Cited

U.S. PATENT DOCUMENTS

2011/0006953 A1* 1/2011 Chiang ................. G06F 1/1698 343/702
2015/0311581 A1* 10/2015 Mo ........................ H01Q 19/10 343/702

(Continued)

FOREIGN PATENT DOCUMENTS

CN 108155455 6/2018
TW 201227235 7/2012

(Continued)

OTHER PUBLICATIONS

English Machine Translation of Lo et al. in TWI688159B (Year: 2020).*

*Primary Examiner* — Graham P Smith
(74) *Attorney, Agent, or Firm* — J.C. PATENTS

(57) ABSTRACT

An electronic device includes a first housing, a second housing, a metal wall disposed between the first housing and the second housing, and an antenna module. The first housing includes a non-metal part. The second housing includes a heat-dissipating vent area corresponding to the position of the non-metal part. The heat-dissipating vent area includes metal connecting bars and air outlets formed therebetween. A cavity is defined by the non-metal part, the metal wall, and the heat-dissipating vent area. The antenna module is in the cavity. The antenna module includes a first antenna layer including a feeding end, a first radiator, and a second radiator and is configured to resonate at a first frequency band and a second frequency band. A length of the first radiator is ¼ wavelength of the first frequency band, and a length of the second radiator is ¼ wavelength of the second frequency band.

7 Claims, 5 Drawing Sheets

(51) Int. Cl.
*H01Q 1/48* (2006.01)
*H01Q 5/307* (2015.01)

(58) Field of Classification Search
CPC ........ H01Q 1/2291; H01Q 1/44; H01Q 21/30; H01Q 9/42; H01Q 1/52
See application file for complete search history.

(56) References Cited

U.S. PATENT DOCUMENTS

| | | | | |
|---|---|---|---|---|
| 2016/0277819 | A1* | 9/2016 | McBroom ................ | H04R 9/06 |
| 2020/0014089 | A1* | 1/2020 | Hung ..................... | H01Q 5/307 |

FOREIGN PATENT DOCUMENTS

| | | | | |
|---|---|---|---|---|
| TW | I627794 | | 6/2018 | |
| TW | I637558 | | 10/2018 | |
| TW | I688159 B | * | 1/2020 | ............... H01Q 1/22 |
| TW | I688159 | | 3/2020 | |

* cited by examiner

ELECTRONIC DEVICE

CROSS-REFERENCE TO RELATED APPLICATION

This application claims the priority benefit of Taiwan applications serial no. 110145422, filed on Dec. 6, 2021. The entirety of the above-mentioned patent application is hereby incorporated by reference herein and made a part of this specification.

BACKGROUND

Technology Field

The present disclosure relates to an electronic device, particularly to an electronic device with an antenna.

Description of Related Art

To provide a more refined appearance, the current laptop is usually given a metal case. However, as an all-metal case often interferes with or limits the effectiveness of an internal antenna, it is the research direction of the present disclosure to solve this problem.

SUMMARY

The disclosure provides an electronic device whose internal antenna module has good antenna performance.

An electronic device of the disclosure includes a first body. The first body includes a first housing, a second housing, a metal wall, and an antenna module. The first housing includes a metal part, and a non-metal part disposed on one side of the first housing. The second housing is connected to the first housing. The material of the second housing is metal, and the second housing includes a heat-dissipating vent area corresponding to the position of the non-metal part. The heat-dissipating vent area includes multiple metal bars and air outlets formed between the metal bars. The metal wall is disposed between the first housing and the second housing and is adjacent to the non-metal part and the heat-dissipating vent area. The non-metal part, the metal wall, and the heat-dissipating vent area define a cavity. The antenna module is in the cavity, and the antenna module includes a first antenna layer. The first antenna layer includes a feeding end, a first radiator extending from the feeding end, and a second radiator extending from the feeding end in a direction away from the first radiator. The first radiator and the second radiator of the antenna module are configured to resonate at a first frequency band and a second frequency band, respectively. The length of the first radiator is ¼ times the wavelength of the first frequency band, and the length of the second radiator is ¼ wavelength of the second frequency band.

In an embodiment of the disclosure, the antenna module further includes a second antenna layer stacked on the first antenna layer, and the coupling distance between the first antenna layer and the second antenna layer is between 0.4 mm and 1 mm.

In an embodiment of the disclosure, the antenna module further includes an insulating layer sandwiched between the first antenna layer and the second antenna layer, and the coupling distance is the thickness of the insulating layer.

In an embodiment of the disclosure, the second radiator includes a ground terminal, and the ground terminal is connected to the second housing.

In an embodiment of the disclosure, the length of the heat-dissipating vent area is between 0.35 times the wavelength and 0.5 times the wavelength of the first frequency band.

In an embodiment of the disclosure, the projection of the antenna module on the second housing partially overlaps the heat-dissipating vent area.

In an embodiment of the disclosure, the length of air outlet is between 3 mm and 5 mm, and the width of air outlet is between 0.8 mm and 1.5 mm.

In an embodiment of the disclosure, the width of each metal bar is equal to the width of each air outlet.

In an embodiment of the disclosure, the second housing includes two enclosed areas disposed on both sides of the heat-dissipating vent area, the length of each enclosed area is between 8 mm and 12 mm, and the width of each enclosed area is between 4 mm and 7 mm.

In an embodiment of the disclosure, the electronic device further includes a second body pivotally connected to the first body, and the second body includes a metal member adjacent to a pivot, and when the second body is tilted relative to the first body, the metal member, the non-metal part, the metal wall, and the heat-dissipating vent area together define the cavity.

Based on the above, the second housing of the electronic device of the disclosure includes a heat-dissipating vent area corresponding to the position of the non-metal part of the first housing. The heat-dissipating vent area includes multiple metal bars and air outlets formed between the metal bars. The non-metal part, the metal wall, and the heat-dissipating vent area define a cavity. The antenna module is in the cavity and is configured to resonate at the first frequency band and the second frequency band. The length of the first radiator is ¼ times the wavelength of the first frequency band, and the length of the second radiator is ¼ times the wavelength of the second frequency band. With the above design, the electronic device of the disclosure provides a complete grounding environment formed by the metal wall, the second housing, and the heat-dissipating vent area, such that the antenna module is able to radiate toward the non-metal part, preventing effectively the radiation of the antenna module from being affected by the shielding of the metal environment.

DESCRIPTION OF THE EMBODIMENTS

Figure 1:
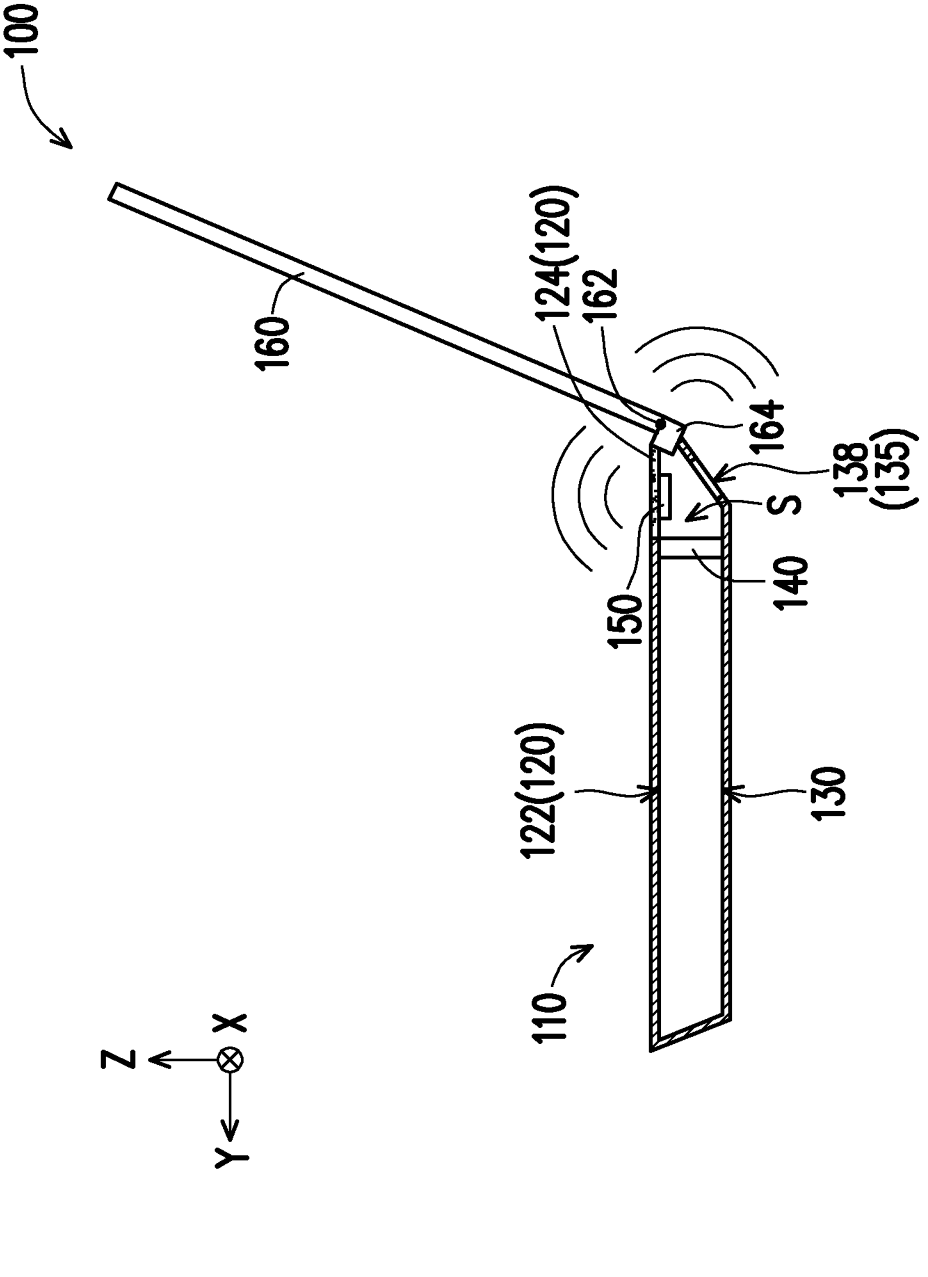
FIG. 1 is a schematic cross-sectional view of an electronic device according to an embodiment of the disclosure.

FIG. 1 is a schematic cross-sectional view of an electronic device according to an embodiment of the disclosure. For the sake of brevity, only the structures related to the present application are shown in FIG. 1.

In FIG. 1, an electronic device 100 of this embodiment is, for example, a laptop. The electronic device 100 includes a first body 110 and a second body 160 pivotally connected to the first body 110. The first body 110 is, for example, the base panel of the laptop, and the second body 160 is, for example, the top panel of the laptop. The type of the electronic device 100 is not limited thereto.

The first body 110 includes a first housing 120, a second housing 130, a metal wall 140, and an antenna module 150. The first housing 120 is, for example, a top housing, and the second housing 130 is, for example, a bottom housing.

Figure 2:
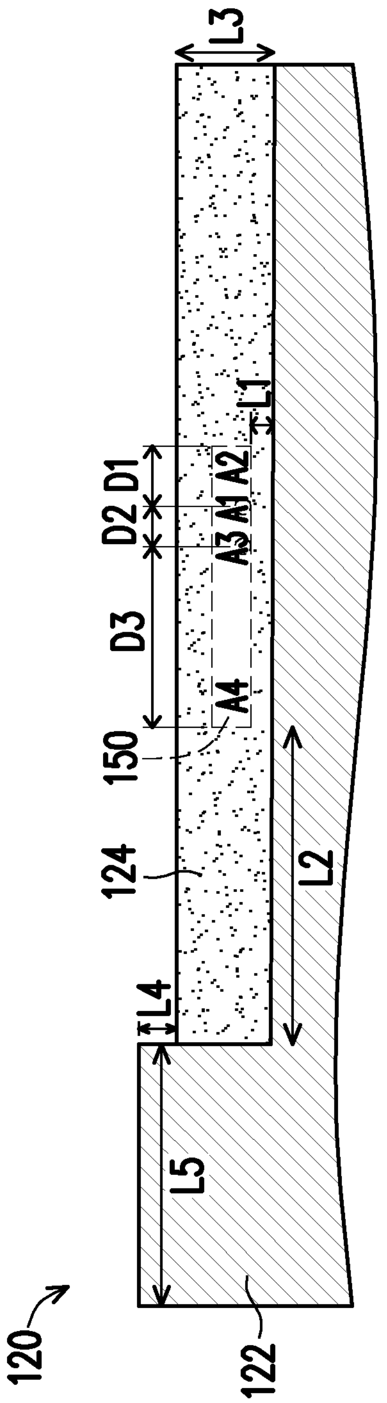
FIG. 2 is a partial top view of the first housing of the electronic device in FIG. 1.

FIG. 2 is a partial top view of the first housing of the electronic device 100 in FIG. 1. Note that FIG. 2 is a schematic top view of the upper left corner of the first housing 120. In FIG. 1 and FIG. 2, the first housing 120 includes a metal part 122 as well as a non-metal part 124 disposed on the side of the first housing 120. Specifically, the first housing 120 is a housing of the keyboard (not shown), and the non-metal part 124 is adjacent to a pivot 162 (FIG. 1) of the second body 160. The material of the non-metal part 124 is, for example, plastic, but not limited thereto. In this embodiment, the antenna module 150 is disposed on the lower surface of the non-metal part 124, and it is represented by the dotted line in FIG. 2.

As shown in FIG. 2, in this embodiment, the distance L1 between the antenna module 150 and the metal part 122 is about 3 mm. The distance L2 between the antenna module 150 and the left edge of the non-metal part 124 is about 25 mm. The width L3 of the non-metal part 124 is about 12 mm. The distance L4 between the upper edge of the non-metal part 124 and the upper edge of the metal part 122 is about 3 mm, and the distance L5 between the non-metal part 124 and the left edge of the metal part 122 is about 30 mm.

As shown in FIG. 1, the second housing 130 is connected to the first housing 120. The material of the second housing 130 is metal, and the second housing 130 includes a heat-dissipating vent area 135 corresponding to the position of the non-metal part 124. The projection of the antenna module 150 on the second housing 130 partially overlaps the heat-dissipating vent area 135.

Figure 3:
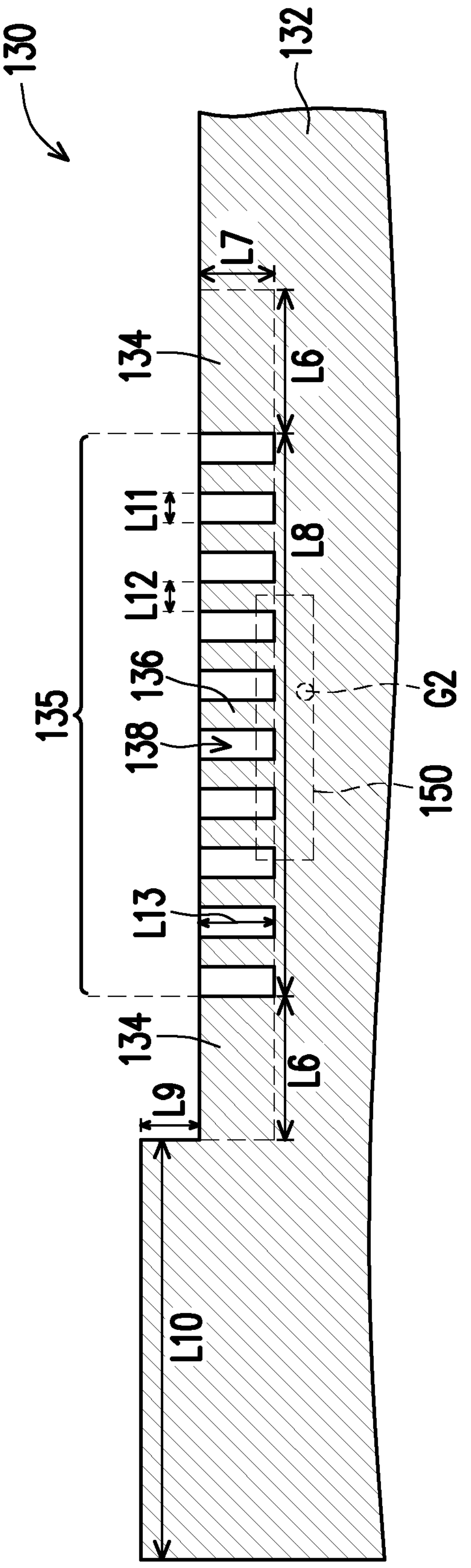
FIG. 3 is a partial top view of the second housing of the electronic device in FIG. 1.

FIG. 3 is a partial top view of the second housing of the electronic device in FIG. 1. Note that FIG. 3 is a schematic plan view of the upper left portion of the second housing 130. As shown in FIG. 3, the heat-dissipating vent area 135 includes a plurality of metal bars 136 and a plurality of air outlets 138 formed between the metal bars 136. In this embodiment, the air outlets 138 are adapted to allow the internal airflow to flow outwards, and also allow the radiation power of the antenna module 150 to pass through.

The second housing 130 further includes two enclosed areas 134 on both sides of the heat-dissipating vent area 135. The length L6 of each enclosed area 134 is between 8 mm and 12 mm, for example, 10 mm. The width L7 of each enclosed area 134 is between 4 mm and 7 mm. The two enclosed areas 134 define a length L8 of the heat-dissipating vent area 135.

The antenna module 150 is configured to resonate at a first frequency band. In this embodiment, the length L8 of the heat-dissipating vent area 135 is between 0.35 times the wavelength and 0.5 times the wavelength of the first frequency band; for example, it may be 0.375 times the wavelength of the first frequency band, which is about 45 mm. Such design enables the radiation power of the antenna module 150 to be radiated through the heat-dissipating vent area 135, which improves the wireless transmission performance of the WiFi 2.4G.

In addition, the distance L9 between the upper edge of the heat-dissipating vent area 135 of the second housing 130 and the upper edge of the second housing 130 is about 5 mm, and the distance L10 between the heat-dissipating vent area 135 and the left edge of the second housing 130 is about 40 mm.

In this embodiment, the length L13 of each air outlet 138 (in the vertical direction of FIG. 3) is between 3 mm and 5 mm. The width L11 of each air outlet 138 (in the horizontal direction of FIG. 3) is between 0.8 mm and 1.5 mm, for example, 1 mm. The width L12 of each metal bar 136 is equal to the width L11 of each air outlet 138. In other words, the width L12 of the metal bar 136 is between 0.8 mm and 1.5 mm, for example, 1 mm.

As shown in FIG. 1, the metal wall 140 is disposed between the first housing 120 and the second housing 130 and is adjacent to the non-metal part 124 and the heat-dissipating vent area 135. The metal wall 140 may be adapted to connect the first housing 120 to the second housing 130 to provide a complete grounding environment, so as to achieve a good grounding effect.

The second body 160 includes a metal member 164 adjacent to the pivot 162. The metal member 164 and other parts of the second body 160 are, for example, L-shaped when viewed from the side. When the second body 160 is tilted relative to the first body 110, the metal member 164, the non-metal part 124, the metal wall 140, and the heat-dissipating vent area 135 together define a cavity S.

Figure 4:
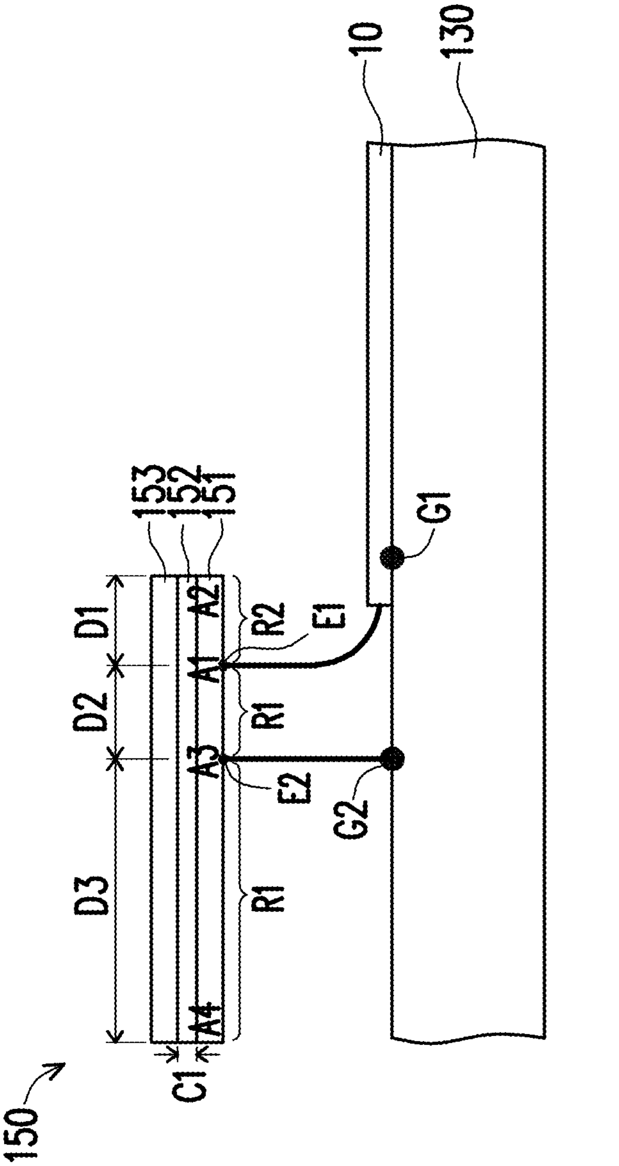
FIG. 4 is a schematic side view of the antenna module and the second housing of the electronic device in FIG. 1.

FIG. 4 is a schematic side view of the antenna module and the second housing of the electronic device in FIG. 1. In FIG. 4, the antenna module 150 in this embodiment includes a first antenna layer 151. The first antenna layer 151 includes a feeding end E1 (see position A1), a first radiator R1 extending from the feeding end E1 (see positions A1, A3, and A4), and a second radiator R2 extending from the feeding end E1 in a direction away from the first radiator R1 (see positions A1 and A2).

The antenna module 150 is configured to resonate at a first frequency band and a second frequency band. The length of the first radiator R1 (see positions A1, A3, and A4) is ¼ wavelength of the first frequency band, and the length of the second radiator R2 (see positions A1 and A2) is ¼ wavelength of the second frequency band.

Specifically, the distance D1 between the positions A1 and A2 is about 5 mm, the distance D2 between the positions A1 and A3 is about 5 mm, and the distance D3 between the positions A3 and A4 is about 15 mm. In other words, the length of the first radiator R1 (see positions A1, A3, and A4) is about 20 mm, and the length of the second radiator R2 (see positions A1 and A2) is about 5 mm.

The antenna module 150 may also optionally include a second antenna layer 153 stacked on the first antenna layer 151. The second antenna layer 153 may be attached to the lower surface of the non-metal part 124. A coupling distance C1 between the first antenna layer 151 and the second antenna layer 153 is between 0.4 mm and 1 mm, for example, 0.5 mm. In addition, the antenna module 150 further includes an insulating layer 152 sandwiched between the first antenna layer 151 and the second antenna layer 153, and the coupling distance C1 is the thickness of the insulating layer 152. The antenna module 150 has better impedance matching of WiFi 6E (5925 to 7125 MHz) due to a multilayer structure.

In addition, the first body 110 further includes a coaxial transmission line 10. The positive end of the coaxial transmission line 10 is connected to the feeding end E1 (at the position A1), and the negative end of the coaxial transmission line 10 is connected to a position G1 to be connected to the system ground plane (i.e., the second housing 130). The second radiator R2 includes a ground terminal E2 (at the position A3), and the ground terminal E2 is connected to the position G2 so as to be connected to the system ground plane (i.e., the second housing 130).

The antenna module 150 is in the cavity S. The antenna module 150 resonates with the cavity S to generate a first frequency band, for example, WiFi 2.4 GHz (2400 MHz to 2484 MHz), a second frequency band, for example, WiFi 5 GHz (5150 MHz to 5850 MHz), and a third frequency band WiFi 6E (5925 MHz to 7125 MHz) and thus has the characteristics of a broadband antenna. The ranges of the first frequency band, the second frequency band, and the third frequency band are not limited thereto.

The electronic device 100 of this embodiment may form a complete grounding environment through the metal wall 140, the second housing 130, and the heat-dissipating vent area 135, such that the antenna module 150 is able to radiate toward the non-metal part 124. The field strength is radiated toward the −Y axis (see FIG. 1) and the Z axis (see FIG. 1), preventing effectively the radiation of the antenna module 150 from being affected by the shielding of the metal environment.

Note here that the number of the antenna modules 150 may be two, and the two antenna modules 150 are each disposed in the upper left corner and the upper right corner of the first body 110. The configuration of the antenna module 150 disposed at the upper left corner of the first body 110 can be seen in FIG. 2 to FIG. 3, whereas the antenna module 150 disposed at the upper left corner of the first body 110 may be configured to approximately mirror the configuration shown in FIG. 2 and FIG. 3.

Figure 5:
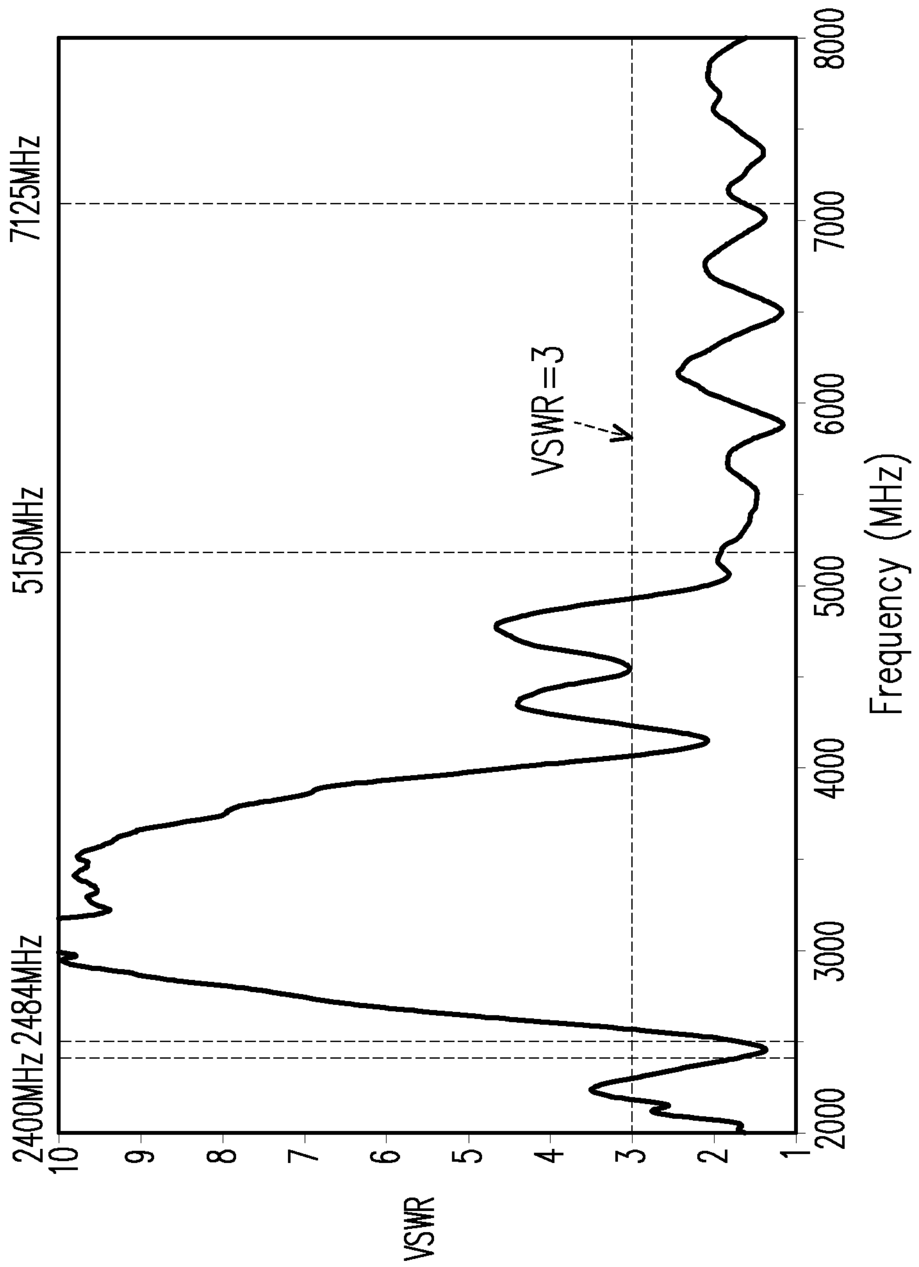
FIG. 5 is a plot diagram showing the relationship between VSWR and frequency of the antenna module of the electronic device in FIG. 1.

FIG. 5 is a plot diagram showing the relationship between VSWR and frequency of the antenna module of the electronic device in FIG. 1. As shown in FIG. 5, the voltage standing wave ratio (VSWR) of the antenna module 150 in this embodiment in the two ranges, 2400 MHz to 2484 MHz and 5150 MHz to 7125 MHz, may be less than 3 and has a good performance.

Figure 6:
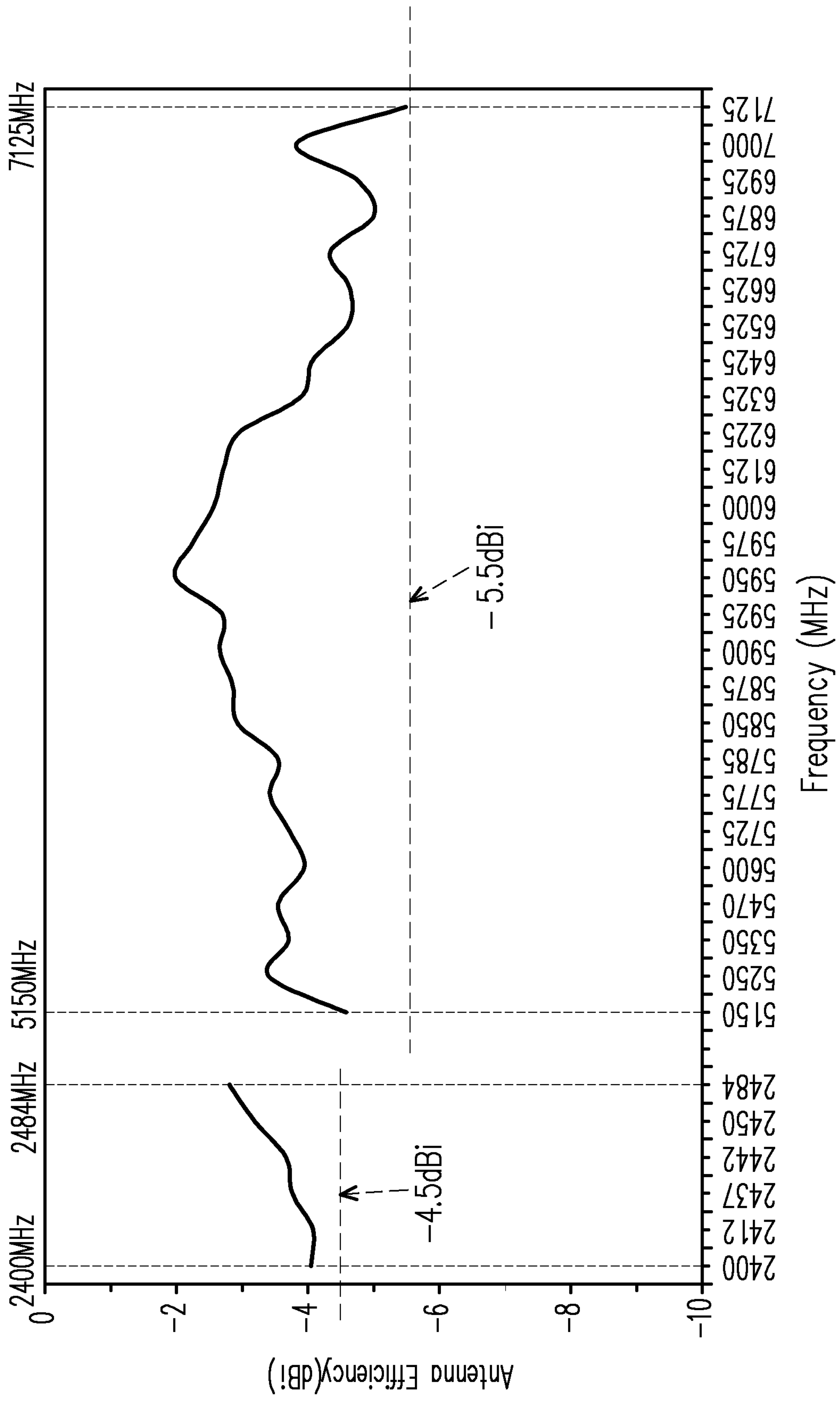
FIG. 6 is a plot diagram showing the relationship between frequency and antenna efficiency of the antenna module of the electronic device in FIG. 1.

FIG. 6 is a plot diagram showing the relationship between frequency and antenna efficiency of the antenna module of the electronic device in FIG. 1. As shown in FIG. 6, the antenna efficiency of the antenna module 150 in this embodiment at 2.4 GHz (2400 MHz to 2484 MHz) is −2.8 to −4.1 dBi, and the antenna efficiency of the antenna module 150 at 5 GHz and 6 GHz (5150 MHz to 7125 MHz) is −2.0 to −5.5 dBi, which shows good antenna efficiency performance.

To sum up, the second housing of the electronic device of the disclosure includes a heat-dissipating vent area corresponding to the position of the non-metal part of the first housing. The heat-dissipating vent area includes multiple metal bars and air outlets formed between the metal bars. The non-metal part, the metal wall, and the heat-dissipating vent area define the cavity. The antenna module is in the cavity and is disposed on the non-metal part. The antenna module is configured to resonate at the first frequency band and the second frequency band. The length of the first radiator is ¼ times the wavelength of the first frequency band, and the length of the second radiator is ¼ times the wavelength of the second frequency band. With the above design, the electronic device of the disclosure provides a complete grounding environment formed by the metal wall, the second housing, and the heat-dissipating vent area, such that the antenna module is able to radiate toward the non-metal part, preventing effectively the radiation of the antenna module from being affected by the shielding of the metal environment.

What is claimed is:

1. An electronic device, comprising:

a first body, comprising:

a first housing comprising a metal part, and a non-metal part disposed on one side of the first housing;

a second housing connected to the first housing, wherein a material of the second housing is metal, the second housing comprises a heat-dissipating vent area corresponding to a position of the non-metal part, and the heat-dissipating vent area comprises a plurality of metal bars and a plurality of air outlets formed between the metal bars;

a metal wall disposed between the first housing and the second housing and located adjacent to the non-metal part and the heat-dissipating vent area, wherein the non-metal part, the metal wall, and the heat-dissipating vent area define a cavity; and an antenna module disposed in the cavity and comprising a first antenna layer, wherein the first antenna layer comprises a feeding end, a first radiator extending from the feeding end, and a second radiator extending from the feeding end in a direction away from the first radiator, wherein the first radiator and the second radiator of the antenna module are configured to resonate at a first frequency band and a second frequency band, respectively, a length of the first radiator is ¼ wavelength of the first frequency band, and a length of the second radiator is ¼ wavelength of the second frequency band, wherein a length of the heat-dissipating vent area is between 0.35 times wavelength and 0.5 times wavelength of the first frequency band, wherein the antenna module comprises a second antenna layer stacked on the first antenna layer and attached to the first housing, and a coupling distance between the first antenna layer and the second antenna layer is between 0.4 mm and 1 mm, and the antenna module comprises an insulating layer sandwiched between the first antenna layer and the second antenna layer, and the coupling distance is a thickness of the insulating layer.

2. The electronic device according to claim 1, wherein the second radiator comprises a ground terminal, and the ground terminal is connected to the second housing.

3. The electronic device according to claim 1, wherein a projection of the antenna module on the second housing partially overlaps the heat-dissipating vent area.

4. The electronic device according to claim 1, wherein a length of each of the air outlets is between 3 mm and 5 mm, and a width of each of the air outlets is between 0.8 mm and 1.5 mm.

5. The electronic device according to claim 1, wherein a width of each of the metal bars is equal to a width of each of the air outlets.

6. The electronic device according to claim 1, wherein the second housing comprises two enclosed areas disposed on both sides of the heat-dissipating vent area, a length of each of the enclosed areas is between 8 mm and 12 mm, and a width of each of the enclosed areas is between 4 mm and 7 mm.

7. The electronic device according to claim 1, further comprising a second body pivotally connected to the first body and comprising a metal member adjacent to a pivot, wherein, when the second body is tilted relative to the first body, the metal member, the non-metal part, the metal wall, and the heat-dissipating vent area together define the cavity.

* * * * *